United States Patent
Wang et al.

(10) Patent No.: US 12,477,419 B2
(45) Date of Patent: Nov. 18, 2025

(54) METHOD AND USER EQUIPMENT FOR COMMUNICATION WITH A WIRELESS NETWORK FOR HANDLING MULTIPLE BANDWIDTH PARTS, BWP

(71) Applicant: Telefonaktiebolaget LM Ericsson (publ), Stockholm (SE)

(72) Inventors: Min Wang, Luleå (SE); Jan Christoffersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 343 days.

(21) Appl. No.: 17/793,981

(22) PCT Filed: Dec. 1, 2020

(86) PCT No.: PCT/SE2020/051149
§ 371 (c)(1),
(2) Date: Jul. 20, 2022

(87) PCT Pub. No.: WO2021/158154
PCT Pub. Date: Aug. 12, 2021

(65) Prior Publication Data
US 2023/0050699 A1 Feb. 16, 2023

Related U.S. Application Data

(60) Provisional application No. 62/969,696, filed on Feb. 4, 2020.

(51) Int. Cl.
*H04W 36/06* (2009.01)
(52) U.S. Cl.
CPC .................................. *H04W 36/06* (2013.01)

(58) Field of Classification Search
CPC ...................................................... H04W 36/06
See application file for complete search history.

(56) References Cited

U.S. PATENT DOCUMENTS

2019/0075585 A1\* 3/2019 Deogun ................... H04B 7/02
2019/0349060 A1 11/2019 Liao et al.
2021/0168862 A1\* 6/2021 Murray ............... H04W 74/002

FOREIGN PATENT DOCUMENTS

WO WO 2019/195563 A1 10/2019

OTHER PUBLICATIONS

International Search Report and Written Opinion of the International Searching Authority, PCT/SE2020/052249, mailed Dec. 4, 2021, 11 pages.

(Continued)

*Primary Examiner* — Natasha W Cosme
(74) *Attorney, Agent, or Firm* — Sage Patent Group

(57) ABSTRACT

A method and a User Equipment, UE, for handling multiple Bandwidth Parts, BWPs, when being connected to a wireless network. The UE is configured to obtain from the network a configuration for use when autonomously switching from a source BWP to a target BWP, said configuration indicating one or more transmissions that the UE can start in the target BWP during a BWP switch. When detecting that the UE is subjected to a trigger event in the source BWP, wherein the trigger event triggers an autonomous BWP switch, the UE transmits to the network in the target BWP a BWP switch request, and the UE also performs at least one further transmission indicated by the obtained configuration.

17 Claims, 7 Drawing Sheets

(56) References Cited

OTHER PUBLICATIONS

"UL BWP Management in NR-U", R1-1813378, Charter Communications, 3GPP TSG-RAN WG1 Meeting #95, Nov. 12-16, 2019, 3 Pages.
"UE behavior upon consistent LBT failure", R2-1915105, Lenovo, Motorola Mobility, 3GPP TSG-RAN WG2 Meeting #108, Nov. 18-22, 2019, 3 Pages.
"Issue on the autonomous BWP switching", R2-1912178, vivo, 3GPP TSG-RAN WG2 Meeting #107bis, Oct. 14-18, 2019, 2 pages.
"Recovery of consistent UL LBT failures", R2-1912474, Samsung, 3GPP TSG-RAN WG2 Meeting #107bis, Oct. 14-18, 2019, 2 pages.
"Medium Access Control (MAC) protocol specification", 3GPP TS 38.321-v15.7.0, (Oct. 2019), 80 pages.

\* cited by examiner

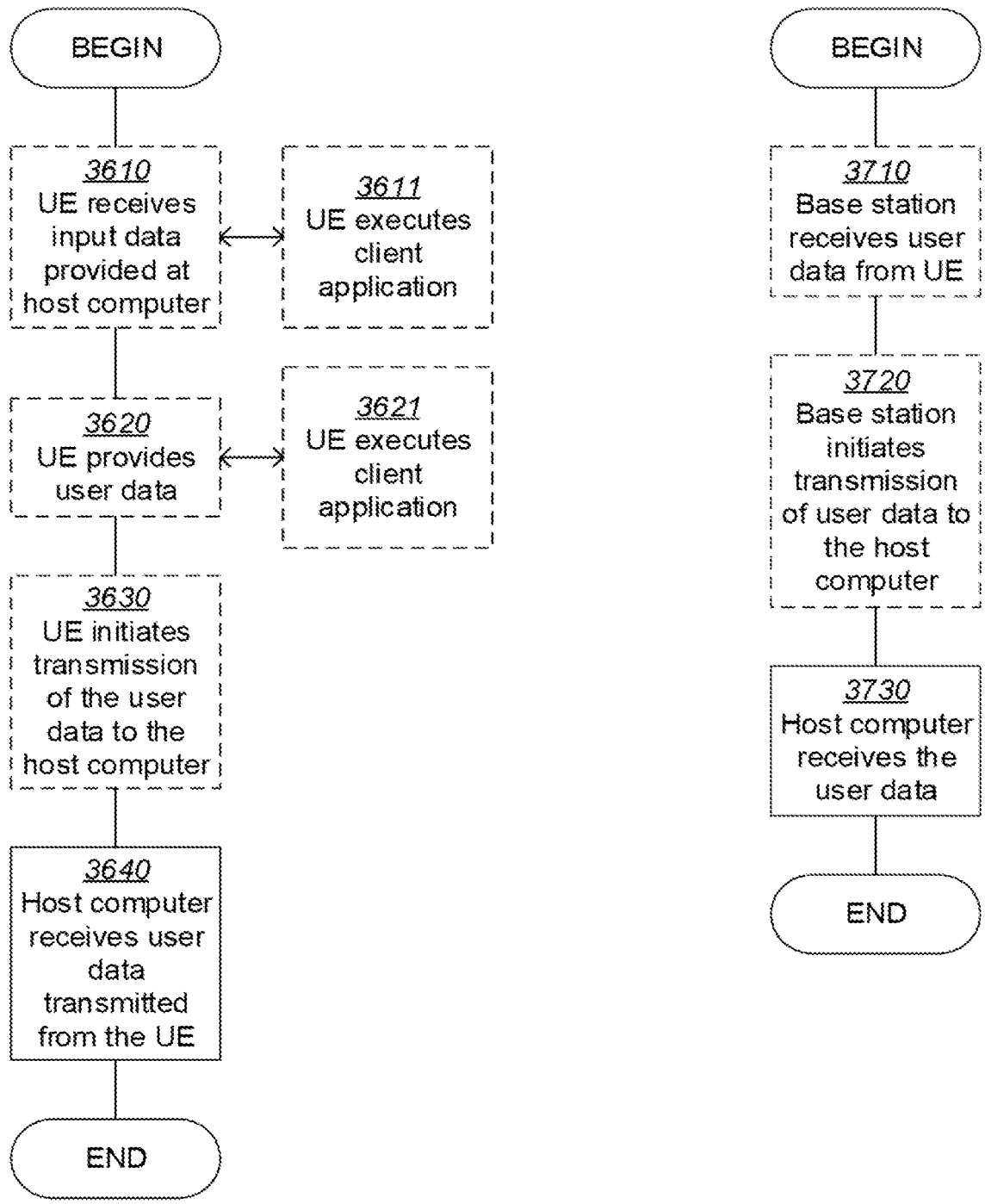

METHOD AND USER EQUIPMENT FOR COMMUNICATION WITH A WIRELESS NETWORK FOR HANDLING MULTIPLE BANDWIDTH PARTS, BWP

This application is a 35 U.S.C. § 371 national stage application of PCT International Application No. PCT/SE2020/051149 filed on Dec. 1, 2020, which in turn claims domestic priority to U.S. Provisional Patent Application No. 62/969,696, filed on Feb. 4, 2020, the disclosures and content of which are incorporated by reference herein in their entirety.

TECHNICAL FIELD

The present disclosure relates generally to a method and a User Equipment, UE, for communication with a wireless network, and more specifically for handling multiple Bandwidth Parts, BWP, when being connected to the wireless network.

BACKGROUND

In this disclosure, the term "User Equipment, UE" is used to represent any communication entity capable of radio communication with a wireless network by sending and receiving radio signals to and from a network node of the network. The UE described herein may be any radio device such as e.g. a mobile telephone, a tablet, a laptop computer and a Machine-to-Machine, M2M, device, also known as Machine Type Communication, MTC, device. Another common generic term in this field is "wireless device" which could be used herein as a synonym for UE. This disclosure is not limited to any particular UE or wireless device, as long as it is capable of radio communication with a wireless network and of using different Bandwidth Parts, BWP, for the radio communication.

Further, the term "network node", is used herein to represent any node of a wireless network that is operative to communicates radio signals with wireless devices. Depending on the terminology used, the network node in this disclosure may refer to a base station, a radio node, a Node B, a base transceiver station, an access point, etc., although this disclosure is not limited to these examples.

In this disclosure, the wireless network will frequently be referred to as "the network" for short and could also be called a wireless communications network. For example, the wireless network may be operating according to Long Term Evolution LTE or according to 5G, also referred to as "New Radio" NR, both being defined by the third Generation Partnership Project, 3GPP. Further, when it is described herein that a UE receives or transmits a message or signal to the network, it should be understood that the message or signal is assumed to be communicated over a network node of the network.

The evolving 5G standard NR is aiming to operate in a wide range of frequencies from below 1 GHz up to 100 GHz. For NR, there is an ongoing discussion in the 3GPP standardization of Band Width Parts (BWPs). The reasons for UEs to use BWPs may include that some UEs might not be able to use the entire Bandwidth (BW) employed by the network, in which case a UE can be assigned a smaller BWP which the UE is capable of handling. Another reason is related to battery savings so that a UE may be assigned a narrower BWP to reduce the energy needed for radio communication. Yet another reason could be for load balancing across available radio resources when the UEs do not need the entire BW to meet certain bit rate requirements.

A BWP is thus a part, or sub-band, of the total BW employed by the network and it follows that the total BW can be sub-divided into multiple BWPs, each BWP thus being smaller than the total BW. Different BWPs may also have different sizes or widths so that one BWP may require less energy in UEs for operation therein than another wider BWP. The assignment of BWP may thus impact the energy consumption in a UE, among other things.

So far, it has been agreed that each UE is assigned with at least an initial BWP which could be the same for all UEs and narrow enough for all UEs to handle according their respective capabilities. The initial BWP is mostly configured in the UEs via transmission of System Information (SI) to the UEs. In addition to the initial BWP, a UE can be configured with additional so called "dedicated" BWPs.

It has further been agreed that a UE can be configured with, or "have", up to four BWPs that can be used for Uplink (UL) and/or Downlink (DL) communication. It has also been agreed that at any point in time, only one BWP can be active for a specific UE, referred to as the active BWP. It is also possible for a UE to switch BWP usage meaning that the UE switches from using a source BWP to using a target BWP. In this disclosure, the term "source BWP" denotes the BWP used basically before a BWP switch and the term "target BWP" denotes the BWP to be used basically after the BWP switch. However, it could sometimes be a problem that a BWP switch may add latency to an ongoing communication.

SUMMARY

It is an object of embodiments described herein to address at least some of the problems and issues outlined above. It is possible to achieve this object and others by using a method and a User Equipment, UE, as defined in the attached independent claims.

According to one aspect, a method performed by a UE is provided for handling multiple Bandwidth Parts, BWP, when being connected to a wireless network. In this method, the UE obtains from the network a configuration for use when autonomously switching from a source BWP to a target BWP, said configuration indicating one or more transmissions that the UE can start in the target BWP during a BWP switch. When detecting that the UE is subjected to a trigger event in the source BWP, wherein the trigger event triggers an autonomous BWP switch, the UE transmits to the network in the target BWP a BWP switch request, and the UE also performs at least one further transmission indicated by the obtained configuration.

According to another aspect, a UE is arranged to handle multiple Bandwidth Parts, BWP, when being connected to a wireless network. The UE is configured to obtain from the network a configuration for use when autonomously switching from a source BWP to a target BWP, said configuration indicating one or more transmissions that the UE can start in the target BWP during a BWP switch. The UE is configured to detect that the UE is subjected to a trigger event in the source BWP, wherein the trigger event triggers an autonomous BWP switch, and in that case the UE is configured to transmit, to the network in the target BWP, a BWP switch request and at least one further transmission indicated by the obtained configuration.

The above method and UE may be configured and implemented according to different optional embodiments to accomplish further features and benefits, to be described below.

A computer program is also provided comprising instructions which, when executed on at least one processor in the above UE, cause the at least one processor to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which:

FIGS. 5-10 illustrate further scenarios, structures and procedures that may be employed when the solution is used, according to further possible examples.

DETAILED DESCRIPTION

In 3GPP NR release 15 (NR Rel-15) and NR release 16 (NR Rel-16) it is mentioned and discussed that a UE may itself initiate a BWP switch from a source BWP to a target BWP to reduce latency, referred to as "autonomous BWP switch", which will be described in more detail herein later below. As mentioned above, latency may be introduced when a UE executes a BWP switch which could be a problem particularly if a delay-sensitive communication is ongoing with critical latency requirements. Another problem that is recognized herein is that the network is not able to control the usage of BWPs in case a UE performs an autonomous BWP switch. This can be addressed by letting the UE obtain a configuration from the network, which configuration indicates one or more transmissions that the UE can autonomously start in the target BWP during a BWP switch. Thereby, the network is able to control what transmissions the UE will perform in the new target BWP.

Figure 1:
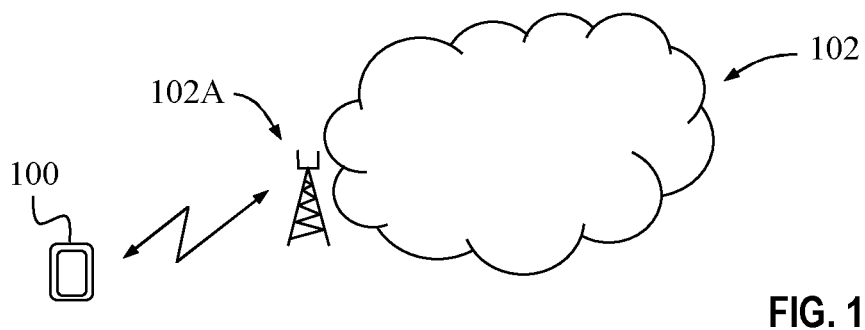
FIG. 1 is a communication overview illustrating a UE in radio communication with a network node of a wireless network.

A simplified communication scenario where the embodiments herein could be employed is illustrated in FIG. 1 involving a UE 100 in radio communication with a network node 202A of a wireless network 202. The UE 100 may communicate with the network 202 through a radio link between the UE 100 and the network node 202A. The network node 102A may be a base station, an access point, a g-NodeB (gNB), etc., depending on the terminology used although the embodiments herein are not limited by these terms. The term gNB is used to represent a network node in some examples to be described later below.

Figure 2:
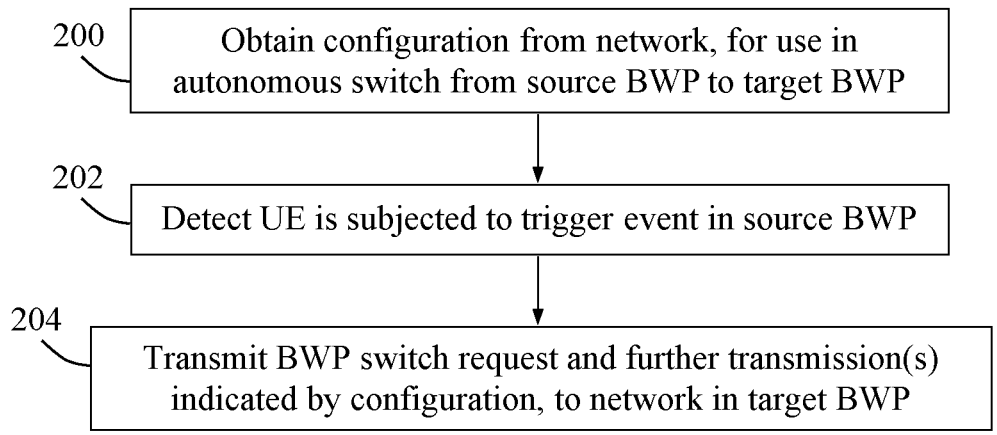
FIG. 2 is a flow chart illustrating a procedure in a UE, according to some example embodiments.

An example of how the solution may be employed in terms of a method with actions performed by a User Equipment, UE such as the UE 100, is illustrated by the flow chart in FIG. 2 which will now be described with further reference to FIG. 1. FIG. 2 thus illustrates a procedure in the UE 100 for handling multiple Bandwidth Parts, BWP, when being connected to a wireless network 102. Some optional example embodiments that could be used in this procedure will also be described.

A first action 200 illustrates that the UE 100 obtains from the network 102 a configuration for use when autonomously switching from a source BWP to a target BWP, said configuration indicating one or more transmissions that the UE can start in the target BWP during a BWP switch.

In a further action 202, the UE 100 detects that it is subjected to a trigger event in the source BWP, wherein the trigger event triggers an autonomous BWP switch. In effect, the trigger event basically determines what condition or situation must occur before the UE initiates an autonomous BWP switch of switching from using the source BWP for the radio communication to using a target BWP for the radio communication. In this disclosure, the term "trigger event" thus denotes such a condition or situation and some non-limiting examples of trigger events are described below.

The UE 100 may itself select which target BWP to use in the BWP switch. The selection of target BWP may be dependent on which trigger event has triggered an autonomous BWP switch in action 202. For example, the trigger event may be related to deficiencies and/or unsuitability of the source BWP for a certain operation or activity in the UE, such as being too wide or too narrow, or lacking certain needed radio resources, and so forth. Further, the UE 100 may have been configured with a set of predefined or predetermined trigger events which are monitored by the UE so as to initiate an autonomous BWP switch whenever one or more of the predefined trigger events is detected to be fulfilled.

In another action 204, the UE 100 transmits, to the network 102 in the target BWP, a BWP switch request and at least one further transmission indicated by the obtained configuration. Thereby, it is an advantage that the communication can start immediately in the new target BWP, as of action 204, and the network also has control of what communication is performed in the target BWP, as of action 200. Some examples of the further transmission performed in action 204 will be mentioned below.

Some further examples of embodiments that may be employed in the above procedure in FIG. 2 will now be described. In some example embodiments, said trigger event may comprise or may be related to any of:

failure of a Listen-Before-Talk, LBT, procedure in the source BWP, lack of radio resources for random access in the source BWP, insufficient bandwidth and/or radio resources in the source BWP, and need for power saving in the UE.

In some further example embodiments, said at least one further transmission indicated by the configuration obtained in action 200, and which thus can be performed in action 204, may comprise a transmission related to or using any of: a Physical Uplink Control Channel PUCCH, a Physical Uplink Shared Channel PUSCH, a Random Access Channel RACH, and a Sounding Reference Signal SRS.

In another example embodiment, the UE 100 may in action 204 transmit the at least one further transmission before receiving a response to the BWP switch request from the network. In another example embodiment, the UE 100 may in that case also continue transmissions in the source BWP until said response is received.

In some further example embodiments, the BWP switch request transmitted in action 204 may comprise any of:

a transmission of a 4-step RACH procedure,
a PUCCH transmission,
a PUSCH transmission, and
a transmission of a 2-step RACH procedure.

In another example embodiment, the above PUSCH transmission that could be transmitted in action 204 may be based on a configured grant.

In some further example embodiments, the configuration obtained from the network in action 200 may be received as carried by any of: Radio Resource Control, RRC, signalling, Medium Access Control, MAC, signalling, and Downlink Control Information, DCI.

Figure 3:
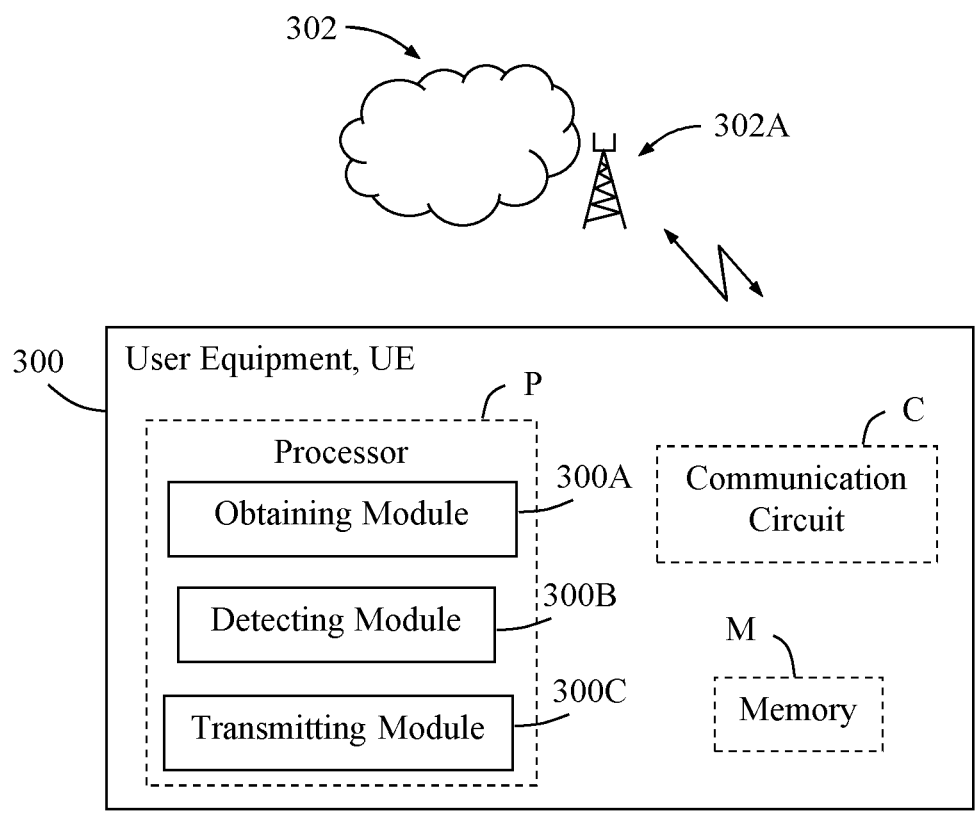
FIG. 3 is a block diagram illustrating how a UE may be structured, according to further example embodiments.

The block diagram in FIG. 3 illustrates a detailed but non-limiting example of how a UE 300 may be structured to bring about the above-described solution and embodiments thereof. In this figure, the UE 300 may be configured to operate according to any of the examples and embodiments of employing the solution as described herein, where appropriate. The UE 300 is shown to comprise a processor "P", a memory "M" and a communication circuit "C" with suitable equipment for transmitting and receiving information and messages in the manner described herein.

The communication circuit C in the UE 300 thus comprises equipment configured for communication using a suitable protocol for the communication depending on the implementation. The solution is however not limited to any specific types of messages or protocols.

The UE 300 is, e.g. by means of units, modules or the like, configured or arranged to perform the actions of the flow chart in FIG. 2 and as follows.

The UE 300 is arranged to handle multiple Bandwidth Parts, BWP, when being connected to a wireless network 302 in radio communication with a network node 302A of the network 302. The UE 300 is configured to obtain from the network 302 a configuration for use when autonomously switching from a source BWP to a target BWP, said configuration indicating one or more transmissions that the UE 300 can start in the target BWP during a BWP switch. This operation may be performed by an obtaining module 300A in the UE 300, as also illustrated in action 200. The obtaining module 300A could alternatively be named a receiving module or configuration module.

The UE 300 is also configured to detect, discover or determine, that the UE is subjected to a trigger event in the source BWP, wherein the trigger event triggers an autonomous BWP switch. This operation may be performed by a detecting module 300B, as also illustrated in action 202. The detecting module 300B could alternatively be named a trigger module or determining module.

The UE 300 is further configured to transmit, to the network in the target BWP, a BWP switch request and at least one further transmission indicated by the obtained configuration. This operation may be performed by a transmitting module 500C in the UE 300, as also illustrated in action 306. The transmitting module 500C could alternatively be named a BWP using module.

Figure 5:
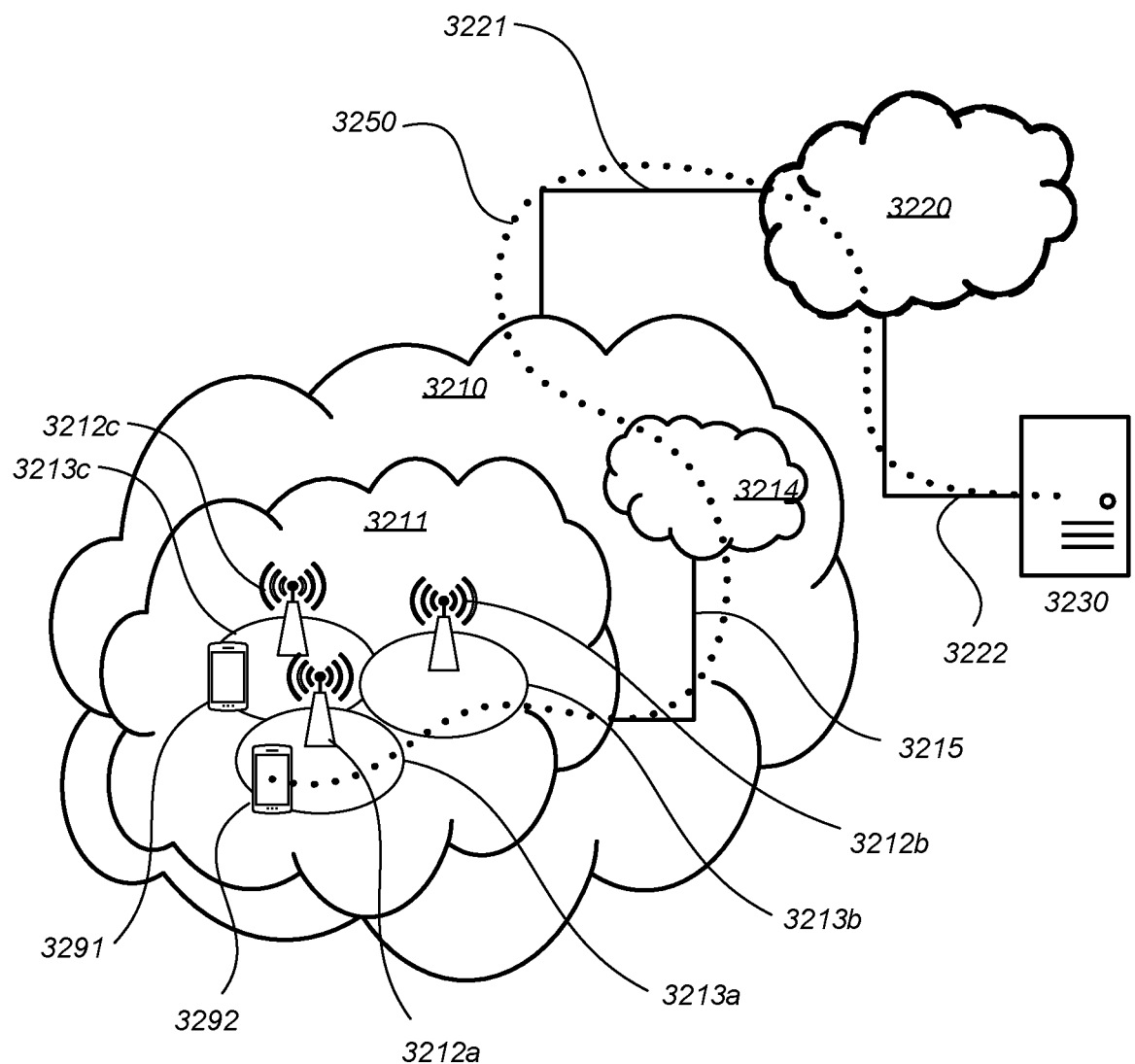

It should be noted that FIG. 5 illustrates various functional modules in the UE 300 and the skilled person is able to implement these functional modules in practice using suitable software and hardware equipment. Thus, the solution is generally not limited to the shown structure of the UE 300, and the functional modules therein may be configured to operate according to any of the features, examples and embodiments described in this disclosure, where appropriate.

The functional modules 300A-C described above may be implemented in the UE 300 by means of program modules of a computer program comprising code means which, when run by the processor P causes the UE 300 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The computer program may be carried by a computer program product in the UE 300 in the form of a memory having a computer readable medium and being connected to the processor P. The computer program product or memory M in the UE 300 thus comprises a computer readable medium on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the UE 300.

The solution described herein may be implemented in the UE 300 by a computer program comprising instructions which, when executed on at least one processor, cause the at least one processor to carry out the actions according to any of the above embodiments and examples, where appropriate. The solution may also be implemented at the UE 300 in a carrier containing the above computer program, wherein the carrier is one of an electronic signal, optical signal, radio signal, or computer readable storage medium.

Some examples of how the above method in FIG. 2 and the apparatus in FIG. 3 could be employed and implemented in practice will be described below. First, some hitherto recognized procedures and potential problems will be discussed in more detail.

It was mentioned above that a UE can be configured with up to four BWPs that can be used for communication while only one active BWP can be used by the UE at a time, and that the UE can autonomously switch from using a source BWP to using a target BWP. In conventional procedures, dedicated BWPs are typically configured using RRC signaling (except for the initial BWP) and switching between BWPs is done by means of signaling DCI from the network on the PDCCH. There is also a possibility to autonomously switch to the initial BWP when a so-called bwp-Inactivity-Timer expires in the UE.

A configured BWP may have RACH resources, but there may also be BWPs without RACH resources, in which case the UE will perform a random access by transmission on another BWP where there are RACH resources available. Also, with respect to PUCCH, a BWP may or may not have PUCCH configured. The reason for not having a PUCCH or RACH configured is that it occupies radio resources which could result in low resource utilization when those channels are not used, especially in configured but not active BWPs.

In case the UE is moved to a BWP without PUCCH configured, the consequence of not having a PUCCH configured in the active BWP is that the UE cannot send PUCCH-SRs in the current active BWP, meaning that the UE would use the RACH channel instead for transmitting SRs, i.e., RA-SRs. Compared to the case of transmitting a PUCCH-SR, it would take much longer time for the UE to get a grant for transmission via a RACH procedure, especially when a RACH collision occurs with other users, i.e. UEs. The long delay for getting a grant may be unacceptable for services with critical latency requirements. Without a PUCCH configured on the current active BWP, other Uplink Control Information (UCI) such as HARQ feedback, CSI for DL transmissions have to be transmitted on the PUSCH in the current active BWP. These transmissions will then compete for resources with traffics with critical Quality-of-Service (QoS) requirements, such as Ultra-Reliable Low Latency Communication (URLLC). The transmission reliability and QoS requirements for both services would then be negatively impacted. Most probably, the network would need to reconfigure the BWP to include a PUCCH resource also on the active BWP in case it was not configured from the start for performance reasons. The RRC reconfiguration procedure would also introduce additional latency for the data transfer which is not acceptable for the latency sensitive services.

In NR Rel-15, a UE can be configured with multiple (max 4) BWPs in DL and UL, while only one BWP can be active at each specific moment. According to clause 5.15 in the 3GPP spec 38.321-v15.7.0, BWP selection (or BWP switching) can be performed by any of the following ways:

By PDCCH (i.e. DCI): a specific BWP can be activated by Bandwidth part indicator in DCI Format 0_1 (a UL Grant) and DCI Format 0_1 (a DL Schedule).
By the bwp-InactivityTimer.
By RRC signalling.
By the MAC entity itself upon initiation of Random Access procedure.

It will now be described how BWPs are operated. According to clause 5.15 in the 3GPP spec 38.321-v15.7.0, the BWP operation is described in the below paragraphs.

The BWP switching for a Serving Cell is used to activate an inactive BWP and deactivate an active BWP at a time. The BWP switching is controlled by the PDCCH indicating a downlink transmission assignment or an uplink transmission grant, by the bwp-InactivityTimer, by RRC signalling, or by the MAC entity itself upon initiation of a Random Access procedure. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id, respectively, is active without receiving PDCCH indicating a downlink assignment or an uplink grant. The active BWP for a Serving Cell is indicated by either RRC or PDCCH. For a so-called "unpaired spectrum", a DL BWP is paired with, or coupled to, a UL BWP, and BWP switching is commonly performed for both UL and DL.

For each activated Serving Cell configured with a BWP, the MAC entity in the UE shall operate as follows:

```
1>if a BWP is activated:
   2>transmit on UL-SCH on the BWP;
   2>transmit on RACH on the BWP, if PRACH occasions are configured;
   2>monitor the PDCCH on the BWP;
   2>transmit PUCCH on the BWP, if configured;
   2>report CSI for the BWP;
   2>transmit SRS on the BWP, if configured;
   2>receive DL-SCH on the BWP;
   2>(re-)initialize any suspended configured uplink grants of configured grant
      Type 1 on the active BWP according to the stored configuration, if any,
      and to start in the symbol according to rules in clause 5.8.2 in the 3GPP
      spec 38.321.
1>if a BWP is deactivated:
   2>not transmit on UL-SCH on the BWP;
   2>not transmit on RACH on the BWP;
   2>not monitor the PDCCH on the BWP;
   2>not transmit PUCCH on the BWP;
   2>not report CSI for the BWP;
   2>not transmit SRS on the BWP;
   2>not receive DL-SCH on the BWP;
   2>clear any configured downlink assignment and configured uplink grant of
      configured grant Type 2 on the BWP;
   2>suspend any configured uplink grant of configured grant Type 1 on the
      inactive BWP.
```

Upon initiation of the Random Access procedure on a Serving Cell, after the selection of carrier for performing Random Access procedure as specified in clause 5.1.1 in the 3GPP spec 38.321, the MAC entity in the UE shall for the selected carrier of this Serving Cell operate as follows:

```
1>if PRACH occasions are not configured for the active UL BWP:
   2>switch the active UL BWP to BWP indicated by initialUplinkBWP;
   2>if the Serving Cell is an SpCell:
      3>switch the active DL BWP to BWP indicated by initialDownlinkBWP.
1>else:
   2>if the Serving Cell is an SpCell:
      3>if the active DL BWP does not have the same bwp-Id as the active UL
         BWP:
         4>switch the active DL BWP to the DL BWP with the same bwp-Id as
            the active UL BWP.
1>stop the bwp-InactivityTimer associated with the active DL BWP of this
   Serving Cell, if running.
1>if the Serving Cell is SCell:
   2>stop the bwp-InactivityTimer associated with the active DL BWP of SpCell,
      if running.
1>perform the Random Access procedure on the active DL BWP of SpCell and
   active UL BWP of this Serving Cell.
```

If the MAC entity receives a PDCCH for BWP switching of a Serving Cell, the MAC entity in the UE shall operate as follows:

> 1>if there is no ongoing Random Access procedure associated with this Serving Cell; or
> 1>if the ongoing Random Access procedure associated with this Serving Cell is successfully completed upon reception of this PDCCH addressed to C-RNTI (as specified in clauses 5.1.4 and 5.1.5 in the 3GPP spec 38.321):
>> 2>perform BWP switching to a BWP indicated by the PDCCH.

If the MAC entity receives a PDCCH for BWP switching for a Serving Cell while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion (as specified in the above-mentioned clauses 5.1.4 and 5.1.5) in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure after performing the BWP switching; if the MAC decides to ignore the PDCCH for BWP switching, the MAC entity shall continue with the ongoing Random Access procedure on the Serving Cell.

Upon reception of RRC (re-)configuration for BWP switching for a Serving Cell while a Random Access procedure associated with that Serving Cell is ongoing in the MAC entity, the MAC entity shall stop the ongoing Random Access procedure and initiate a Random Access procedure after performing the BWP switching.

The MAC entity in the UE shall, for each activated Serving Cell configured with bwp-InactivityTimer, operate as follows:

> 1>if the defaultDownlinkBWP-ld is configured, and the active DL BWP is not the BWP indicated by the defaultDownlinkBWP-ld; or
> 1>if the defaultDownlinkBWP-ld is not configured, and the active DL BWP is not the initialDownlinkBWP:
>> 2>if a PDCCH addressed to C-RNTI or CS-RNTI indicating downlink assignment or uplink grant is received on the active BWP; or
>> 2>if a PDCCH addressed to C-RNTI or CS-RNTI indicating downlink assignment or uplink grant is received for the active BWP; or
>> 2>if a MAC PDU is transmitted in a configured uplink grant or received in a configured downlink assignment:
>>> 3>if there is no ongoing Random Access procedure associated with this Serving Cell; or
>>> 3>if the ongoing Random Access procedure associated with this Serving Cell is successfully completed upon reception of this PDCCH addressed to C-RNTI (as specified in clauses 5.1.4 and 5.1.5):
>>>> 4>start or restart the bwp-InactivityTimer associated with the active DL BWP.
>> 2>if the bwp-InactivityTimer associated with the active DL BWP expires:
>>> 3>if the defaultDownlinkBWP-ld is configured:
>>>> 4>perform BWP switching to a BWP indicated by the defaultDownlinkBWP-ld.
>>> 3>else:
>>>> 4>perform BWP switching to the initialDownlinkBWP.
> NOTE: If a Random Access procedure is initiated on an SCell, both this SCell and the SpCell are associated with this Random Access procedure.
> 1>if a PDCCH for BWP switching is received, and the MAC entity switches the active DL BWP:
>> 2>if the defaultDownlinkBWP-ld is configured, and the MAC entity switches to the DL BWP which is not indicated by the defaultDownlinkBWP-ld; or
>> 2>if the defaultDownlinkBWP-ld is not configured, and the MAC entity switches to the DL BWP which is not the initialDownlinkBWP:
>>> 3> start or restart the bwp-InactivityTimer associated with the active DL BWP.

From the above, it can be seen that in NR Rel-15, the UE may autonomously switch BWP to the initial BWP if:
 1. The UE has triggered a Random access procedure but there are no RA resources on the active BWP.
 2. The bwp-InactivityTimer expires.

In NR Rel-16, it has been agreed in RAN2 #108 that if there are consistent UL LBT failures detected in a BWP of a serving cell, the UE can autonomously switch to another BWP with RACH resources configured and initiate a RACH procedure in that BWP. Upon reception of the RA transmission, the gNB may confirm in the DL via a DCI which indicates the same BWP as the UE selected or a different BWP.

Some potential problems with the existing procedures according to NR Rel-15, NR Rel-16 and future releases will now be discussed.

In NR Rel-15, a BWP switch can be triggered by a UE MAC entity itself upon initiation of Random Access procedure. In this case, the UE MAC shall operate as follows:

```
1>if PRACH occasions are not configured for the active UL BWP:
   2>switch the active UL BWP to BWP indicated by initialUplinkBWP;
   2>if the Serving Cell is an SpCell:
      3>switch the active DL BWP to BWP indicated by initialDownlinkBWP.
1>else:
   2>if the Serving Cell is an SpCell:
      3>if the active DL BWP does not have the same bwp-Id as the active UL
        BWP:
         4>switch the active DL BWP to the DL BWP with the same bwp-Id as
           the active UL BWP.
```

In NR Rel-16, there is an additional reason which may cause a UE to trigger a BWP switch. This reason is for a UE supporting NR unlicensed operation, where it has been agreed in RAN2 #108 that if there are consistent UL LBT failures detected in a BWP of a serving cell, the UE can autonomously switch to another BWP with RACH resources configured and initiate a RACH procedure in that BWP. Upon reception of the RA transmission, the gNB may confirm in the DL via a DCI which indicates the same BWP as the UE selected or a different BWP.

In future releases beyond NR Rel-16, more reasons which could trigger the UE to perform a BWP switch can be expected. In one example, the UE's currently active BWP has insufficient resources for UL data transmission so that the UE cannot transmit the data in the UL in time, i.e. the UE needs a BWP with wider BW and/or less UL load. Due to congestion, the UE can neither transmit a scheduling request nor a buffer status report, so that the gNB would not be aware of the UE's situation in time. For data with critical latency requirements, this would incur latency. It is therefore beneficial for the UE to switch to another BWP which is less loaded.

In another example, it could be helpful for the UE to use a narrower bandwidth than a wider bandwidth from UE battery saving purpose. The gNB may not be aware of the status of the UE's battery life. Anytime when it is necessary to save UE battery, it would be beneficial for the UE to switch to a narrower BWP from a wider BWP. Hence, there are situations when it would be advantageous for the UE to autonomously switch from a currently used source BWP to either a wider target BWP or to a narrower target BWP.

For a RA triggered by a UE for switching BWP purpose in NR unlicenced spectrum (NR-U), the UE waits for a confirmation message after transmission of the Msg3 or msgA (if the 2-step RA procedure is used). This is done by a PDCCH addressed to C-RNTI, after which the RA procedure is successfully completed. When the autonomous BWP switch is done, the random access procedure is needed only to inform the gNB of the BWP switch. The reason for this is that both the UE and gNB need to know (and have the same understanding of) which BWP is active. The UE can further perform BWP switching as indicated by the PDCCH.

When the UE changes to a different BWP within the same serving cell, it is typically not needed to update the UE's uplink timing alignment. While the UE performs the BWP switch, the UE may still maintain its uplink alignment which was obtained in the source BWP. In this case, it is feasible for the UE to perform other uplink transmissions such as a configured grant based PUSCH in the target BWP while the RA procedure related to the BWP switch is on-going.

On the other hand, although the UE may also need to update its uplink alignment when the UE switches to a different BWP in some cases, it is still feasible for the UE to perform other uplink transmissions which are not requiring strict uplink alignment in the target BWP while the RA procedure related to the BWP switch is on-going.

During the RA procedure for BWP switch as agreed for NR-U, it is only the RA messages that are allowed to be transmitted while the other channels such as PUCCH, PUSCH with configured grant are not allowed to be used in the target BWP even though they are configured in the target BWP. The RA procedure is slow, which may result in an interruption of the data. In case the cell has high RA load, the RA procedure would take even longer time to complete. For latency critical services such as URLLC, the incurred latency due to RA may be not acceptable. Therefore, it is meaningful to search for possible enhancements to reduce the latency due to a BWP switch triggered by the UE itself.

Some further details and features of the embodiments herein will now be discussed in more detail, by reference to some examples of implementation.

In the embodiments herein, some example conditions when a UE is allowed to do autonomous BWP switch, i.e. according to the above-described trigger event, are identified, and some example procedures and operations in the UE to achieve this are described. For example, the conditions in the form of one or more trigger events can be monitored by the UE which could be based on consistent UL LBT failures, need for wider BW, need for a narrower BW, and latency requirements of data to be transmitted by the UE.

The selection of which BWP to switch to, i.e. selection of the target BWP, can be based on the total BW employed by the network, availability of 4-step RA resources, availability of 2-step RA resources and availability of CG resources on the new BWP.

The UE thus switches from the source BWP to the target BWP and may perform either a 4-step RA, a 2-step RA or a configured grant transmission on the new target BWP, the C-RNTI MAC CE and possibly data may be included in the first transmission on the target BWP. The BWP switch can be deemed completed when the gNB responds to the UE with a PDCCH addressed to the C-RNTI indicating BWP switch to the new BWP.

Advantages that could be achieved when using the embodiments herein may include:

- The UE is able to perform an autonomous BWP switch while the network is able to control which transmissions to be performed in the target BWP.
- Data transmission interruptions can be minimized.
- The latency for UL data with critical latency requirement can be minimized.
- The embodiments herein are applicable to both licensed and unlicensed spectrum scenarios.

Some examples of implementation will now be described.

Example 1

During a UE triggered autonomous BWP switching procedure, besides transmission of BWP switch related messages initiated by the UE in a target BWP (e.g. Random access in case of NR-U and consistent UL LBT failures), the UE is configured to also perform other additional transmissions, referred to as further transmissions above, such as configured grant based PUSCH, PUCCH, or SRS, in the target BWP immediately upon start of the BWP switching procedure. In this way, the UE can start transmissions in the selected target BWP before reception of the command/confirmation message from the gNB, and it may be beneficial for the UE to achieve a lower latency for data transmissions. In addition, the UE may operate depending on whether the message has indicated the same BWP as the one the UE has requested in the above-described BWP switch request. Two example cases could be as follows:

1. If the gNB responds that the UE should use the same target BWP as which the UE requested, the UE can just continue transmissions in the target BWP after the BWP transition period.
2. If the gNB responds that the UE uses a different BWP as the UE requested, the UE stops the transmissions in the target BWP, and perform a BWP switch to the one that the command/confirmation message has indicated. After the BWP transition period, the UE starts transmissions in that new BWP instead.

For both of the above cases, the UE may also provide information to the gNB about the reason why the UE has initiated the BWP switch autonomously, and/or about what transmissions that the UE has performed in the target BWP so far.

Example 2

During a BWP switching which is triggered by a UE, the UE starts a Random access procedure on the new target BWP, but the UE is configured to keep transmissions in the source BWP until reception of the response message from the gNB. In such behaviors, the interruptions for the data transfer due to a BWP switching can be minimized. The gNB may in the response message instruct the UE to stay at the same source BWP. In this case, the UE can just continue transmissions in the source BWP. If the gNB has indicated in the response message that the UE should switch to a different BWP than the source BWP, the UE can stop transmissions in the source BWP.

Example 3

For any of the above examples 1-2, the UE is configured by the gNB with at least one of the information below:
- Whether or not the UE is allowed to initiate other additional transmissions in the target BWP during a UE triggered BWP switch procedure.
- Whether or not the UE is allowed to continue transmissions in the source BWP during a UE triggered BWP switch procedure
- If allowed, under what conditions the UE can perform the configured actions.

Figure 4:
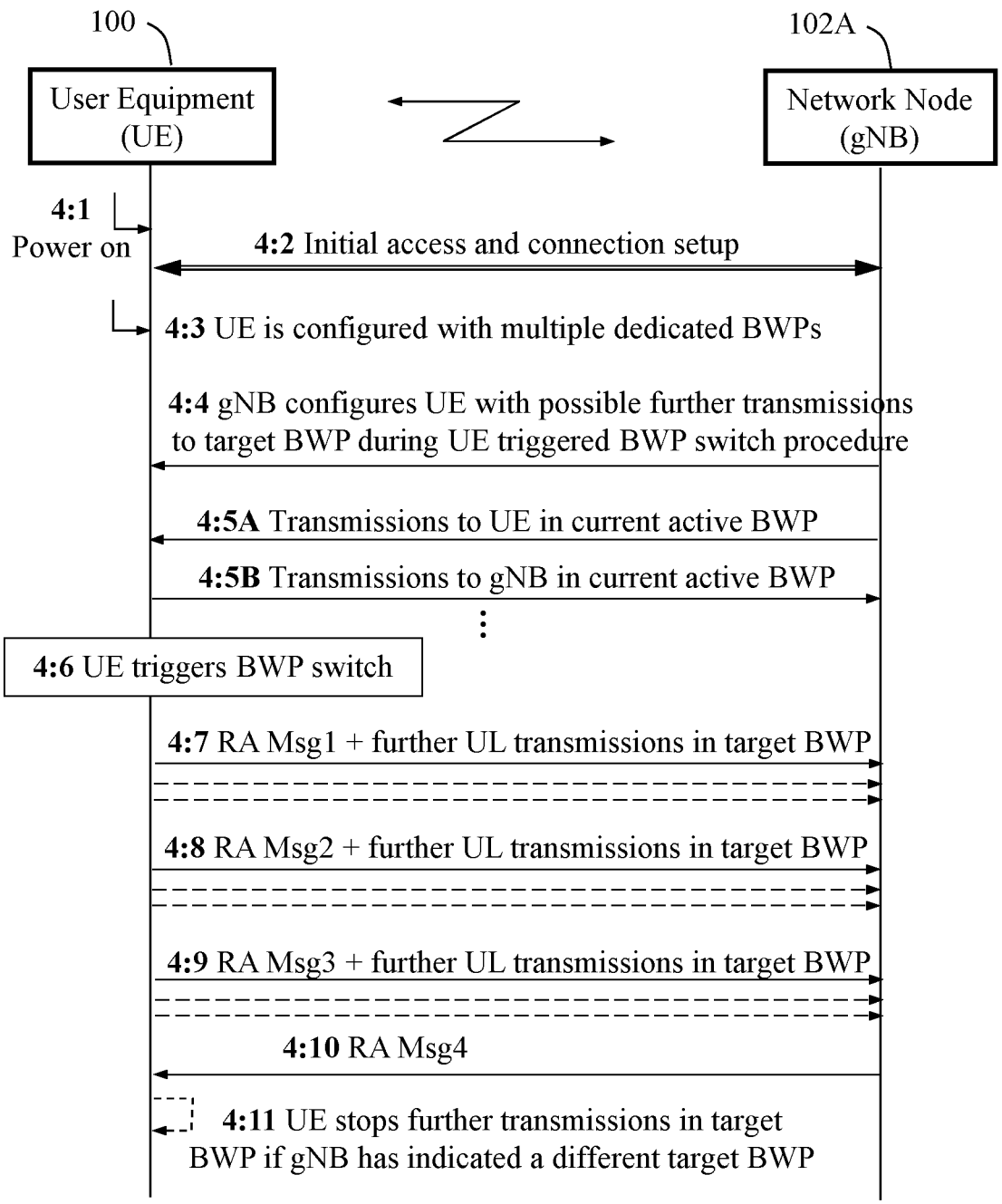
FIG. 4 is a signaling diagram illustrating an example of how a UE may operate and interact with a wireless network through radio communication with a network node therein, according to further example embodiments.

In this example, a 4-step random access procedure is used to indicate the BWP switch. A signaling diagram in FIG. 4 illustrates how a UE 100 may operate and communicate with a network over a network node 102A therein, e.g. a gNB, when performing a UE triggered autonomous BWP switch, which is in accordance with the method in FIG. 2. In action 4:1, the UE 100 is powered on and it performs initial access to the network and connection set up with the network node 102A in action 4:2. The following action 4:3 indicates that the UE 100 is configured by the network node 102A with a set of dedicated BWPs, which corresponds to action 200 in FIG. 2. In action 4:4, the UE 100 is further configured by the network node 102A with possible further transmissions to the target BWP during a UE triggered BWP switch procedure. The following actions 4:5A and 4:5B illustrate that the UE 100 receives and performs, respectively, transmissions from/to the network node (e.g. gNB) 102A in the current active BWP. It should be noted that in actions 4:5A-4:5B, the term "current active BWP" corresponds to the above-described source BWP.

Once a BWP switch is triggered in action 4:6, which corresponds to action 202 in FIG. 2, as the above-described trigger event is monitored, the UE 100 then performs a 4-step RACH procedure as follows. The 4-step RACH procedure involves four messages denoted RA Msg1-RA Msg4 which are communicated in actions 4:7-4:10, respectively, as well as further UL transmissions in the target BWP. After the 4-step RACH procedure, an optional action 4:11 indicates that the UE 100 may stop any further transmissions in the target BWP if the network node (e.g. gNB) 102A has indicated that a different target BWP shall be used instead.

Example 4

A 2-step random access procedure is used to indicate the BWP switch. In this way, a new trigger for 2-step RA is defined accordingly. The C-RNTI MAC CE or other MAC CE indicating that the UE is switching BPW is included in a message called msgA to indicate that the UE switches BWP. The UE can be configured to also include data in msgA and use other UL channels immediately without receiving a response from gNB. The UE can alternatively be configured to continue UL transmissions on the source BWP until receiving a response from the gNB indicating a BWP switch.

Example 5

A configured grant transmission is used to indicate the BWP switch. The C-RNTI MAC CE or other MAC CE indicating that the UE is switching BPW is included in the configured grant transmission to indicate that the UE switches BWP. The UE can be configured to also include data in the configured grant transmission and use other UL channels immediately without receiving a response from gNB. The UE can alternatively be configured to continue UL transmissions on the source BWP until receiving a response from the gNB indicating a BWP switch.

In case the configured grant is dedicated to the UE, the C-RNTI MAC CE or other MAC CE indicating that the UE is switching BPW may be not needed since the gNB may deduce this information upon receiving a transmission on the configured grant resource in the new BWP.

In case a Contention Free Random Access (CFRA) procedure is used to indicate that the UE is doing a BWP switch, the C-RNTI MAC CE or other MAC CE indicating that the UE is switching BPW may be not needed since the gNB can deduce this information upon receiving the transmission (preamble or RACH occasion) in the new BWP.

The selection of target BWP for the BWP switch can depend on the resources of configured BWPs and the trigger for the BWP switch. For example, if the BWP switch is triggered to reduce UE battery consumption, the main selection criteria could be the most narrow BW. If the BWP switch is triggered to support URLLC transmissions, the selection criteria could be to select a BWP with CG to allow BWP switch without RACH transmissions or to select a BWP with 2-step RACH resources.

Example 6

For any of the above examples 1-5, the types of transmissions that can be started in the target BWP or the source BWP while a UE triggered BWP switch procedure is on-going are configured by the gNB. These types of transmissions may comprise PUCCH; PUSCH; RACH; and SRS transmissions.

It will now be described how the solution could be employed when a UE is operating in an unlicensed spectrum.

When in unlicensed operation, the UE has been detecting consistent UL LBT failures in its current active BWP, a consistent UL LBT failure event is triggered eventually for the BWP. Upon detecting the trigger event, the UE autonomously selects a different BWP where RA resource is configured and initiates a contention-based RA on that BWP. The UE has URLLC data in the buffer. Since the UE has been configured to be able to initiate other transmissions in the target BWP while a RA for BWP switch is on-going, after transmission of the Msg1, the UE can start to transmit URLLC data on PUSCH using a configured grant in the target BWP. This would be beneficial for the UE to reduce latency for the URLLC data. Prior to the RA procedure is completed, the UE may be able to transmit all URLLC data in the buffer.

While the solution has been described with reference to specific exemplifying embodiments, the description is generally only intended to illustrate the inventive concept and should not be taken as limiting the scope of the solution. For example, the terms "network node", "User Equipment (UE)", "BWP switch", "source BWP", "target BWP", "configuration", and "BWP switch request" have been used throughout this disclosure, although any other corresponding entities, functions, and/or parameters could also be used having the features and characteristics described here. The solution may be implemented according to the appended claims.

Further Extensions and Variations

With reference to FIG. 5, in accordance with an embodiment, a communication system includes a telecommunication network 3210 e.g. a WLAN, such as a 3GPP-type cellular network, which comprises an access network 3211, such as a radio access network, and a core network 3214. The access network 3211 comprises a plurality of base stations 3212a, 3212b, 3212c, such as access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 5 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 6. In a communication system 3300, a host computer 3310 comprises hardware 3315 including a communication interface 3316 configured to set up and maintain a wired or wireless connection with an interface of a different communication device of the communication system 3300.

The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 6) served by the base station 3320. The communication interface 3326 may be configured to facilitate a connection 3360 to the host computer 3310. The connection 3360 may be direct or it may pass through a core network (not shown in FIG. 6) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 6:
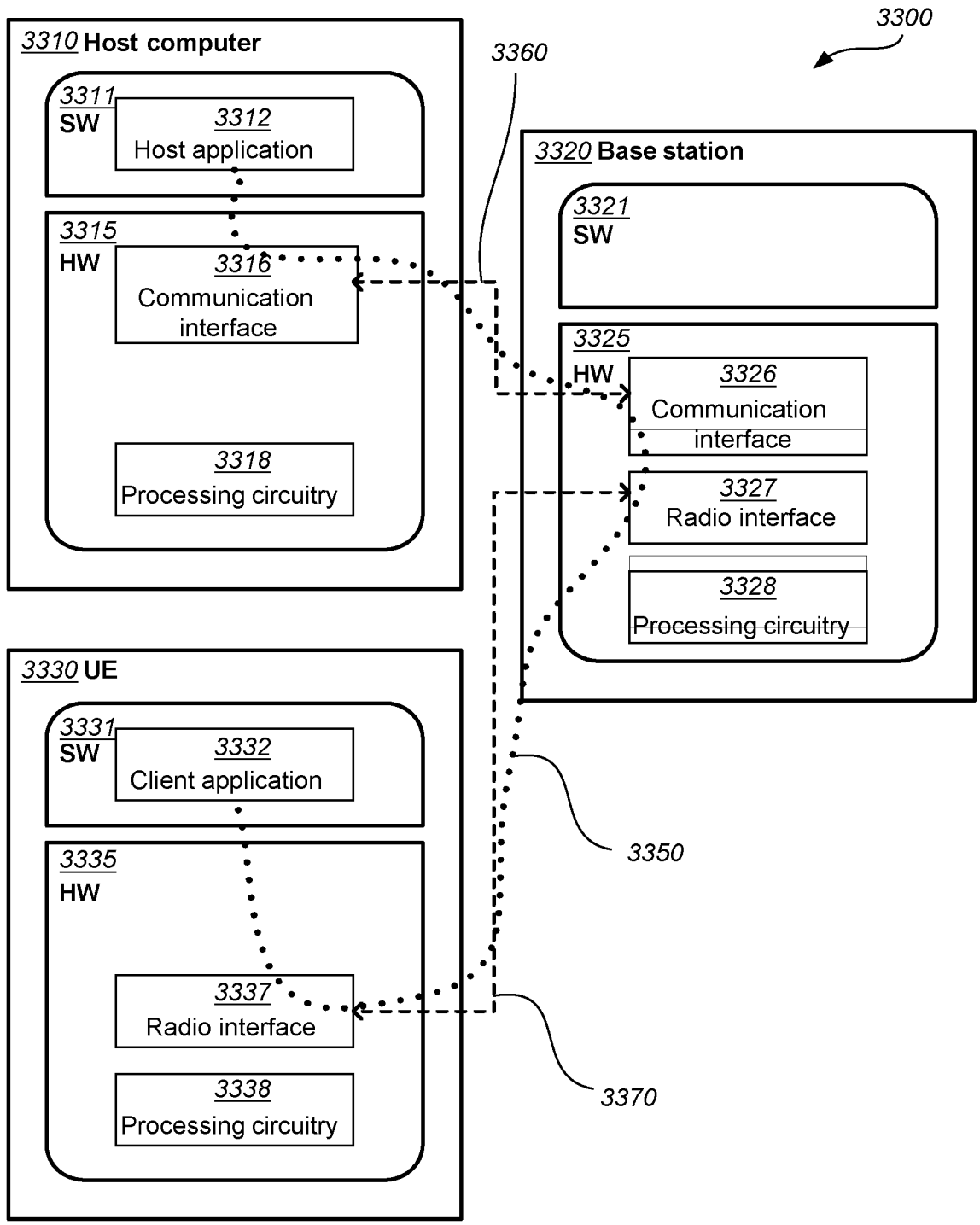

It is noted that the host computer 3310, base station 3320 and UE 3330 illustrated in FIG. 6 may be identical to the host computer 3230, one of the base stations 3212a, 3212b, 3212c and one of the UEs 3291, 3292 of FIG. 5, respectively. This is to say, the inner workings of these entities may be as shown in FIG. 6 and independently, the surrounding network topology may be that of FIG. 5.

In FIG. 6, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the efficiency in communication and thereby provide benefits such as better utilization of resources in the network.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In some embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 7:
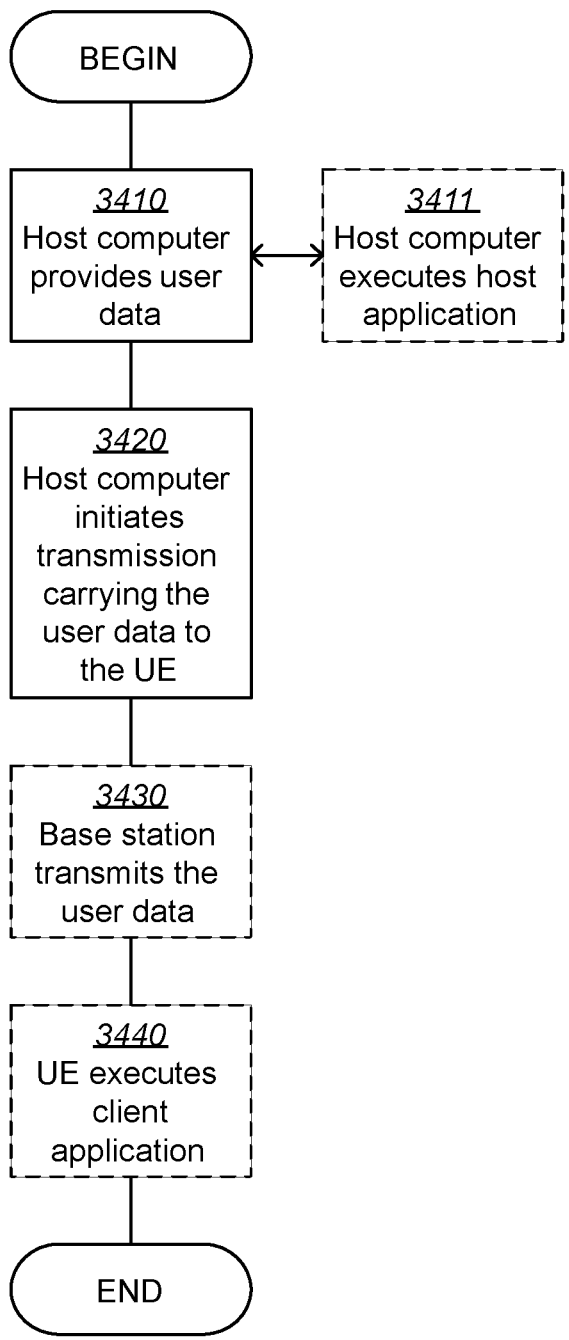

FIG. 7 is a flowchart illustrating a method implemented in a communication system, in accordance with one embodiment. The communication system includes a host computer, a base station such as a AP STA, and a UE such as a Non-AP STA which may be those described with reference to FIGS.

5 and 6. For simplicity of the present disclosure, only drawing references to FIG. 7 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

Figure 8:
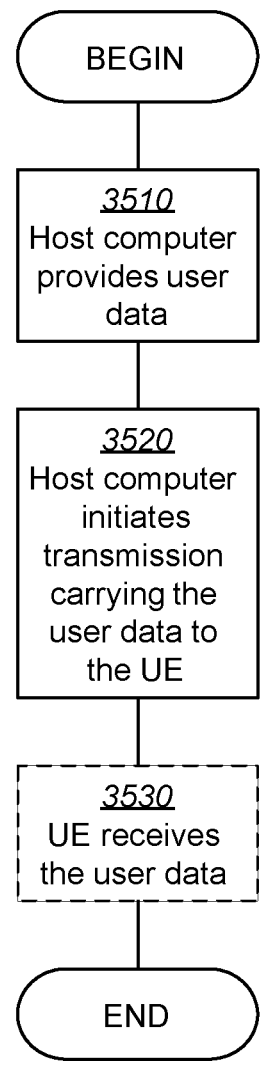

FIG. 8 is a flowchart illustrating a method implemented in a communication system, in accordance with one embodiment. The communication system includes a host computer, a base station such as a AP STA, and a UE such as a Non-AP STA which may be those described with reference to FIGS. 5 and 6. For simplicity of the present disclosure, only drawing references to FIG. 8 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 9 is a flowchart illustrating a method implemented in a communication system, in accordance with one embodiment. The communication system includes a host computer, a base station such as a AP STA, and a UE such as a Non-AP STA which may be those described with reference to FIGS. 5 and 6. For simplicity of the present disclosure, only drawing references to FIG. 9 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 5 and 6. For simplicity of the present disclosure, only drawing references to FIG. 10 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a User Equipment (UE) for handling multiple Bandwidth Parts (BWP) when being connected to a wireless network, the method comprising:
    obtaining from the network a configuration for use when autonomously switching from a source BWP to a target BWP, said configuration indicating one or more transmissions that the UE can immediately start in the target BWP during a BWP switch,
    detecting that the UE is subjected to a trigger event in the source BWP, wherein the trigger event triggers an autonomous BWP switch, and
    transmitting, to the network in the target BWP, a BWP switch request and at least one further transmission indicated by the obtained configuration, wherein said at least one further transmission indicated by the obtained configuration includes a transmission separate from a random access procedure, and wherein said at least one further transmission is transmitted, to the network in the target BWP, before receiving a response to the BWP switch request from the network.

2. A method according to claim 1, wherein said trigger event comprises or is related to:
    failure of a Listen-Before-Talk (LBT) procedure in the source BWP.

3. A method according to claim 1, wherein the UE continues transmissions in the source BWP until said response is received.

4. A method according to claim 1, wherein the BWP switch request comprises any of:
    a transmission of a 4-step RACH procedure, and
    a transmission of a 2-step RACH procedure.

5. A method according to claim 4, wherein the PUSCH transmission is based on a configured grant.

6. A method according to claim 1, wherein said configuration obtained from the network is received as carried by any of: Radio Resource Control (RRC) signalling, Medium Access Control (MAC) signalling, and Downlink Control Information (DCI).

7. A method according to claim 1, wherein said trigger event comprises or is related to any of:
    lack of radio resources for random access in the source BWP,
    insufficient bandwidth and/or radio resources in the source BWP, and
    need for power saving in the UE.

8. A method according to claim 1, wherein the BWP switch request comprises any of:
    a PUCCH transmission, and
    a PUSCH transmission.

9. A method according to claim 1, further comprising: autonomously switching from transmitting over the source BWP to the target BWP when a BWP Inactivity Timer expires.

10. A User Equipment (UE) arranged to handle multiple Bandwidth Parts (BWP) when being connected to a wireless network, wherein the UE is configured to:
    obtain from the network a configuration for use when autonomously switching from a source BWP to a target BWP, said configuration indicating one or more transmissions that the UE can immediately start in the target BWP during a BWP switch, detect that the UE is subjected to a trigger event in the source BWP, wherein the trigger event triggers an autonomous BWP switch, and transmit, to the network in the target BWP, a BWP switch request and at least one further transmission indicated by the obtained configuration, wherein said at least one further transmission indicated by the obtained configuration includes a transmission separate from a random access procedure, and wherein said at least one further transmission is transmitted, to the network in the target BWP, before receiving a response to the BWP switch request from the network.

11. A UE according to claim 10, wherein said trigger event comprises or is related to any of:

failure of a Listen-Before-Talk (LBT) procedure in the source BWP, lack of radio resources for random access in the source BWP, insufficient bandwidth and/or radio resources in the source BWP, and need for power saving in the UE.

12. A UE according to claim 10, wherein the UE is configured to continue transmissions in the source BWP until said response is received.

13. A UE according to claim 10, wherein the BWP switch request comprises any of:

a transmission of a 4-step RACH procedure, a PUCCH transmission, a PUSCH transmission, and a transmission of a 2-step RACH procedure.

14. A UE according to claim 13, wherein the PUSCH transmission is based on a configured grant.

15. A UE according to claim 10, wherein the UE is configured to receive said configuration obtained from the network as carried by any of: Radio Resource Control (RRC) signalling, Medium Access Control (MAC) signalling, and Downlink Control Information (DCI).

16. A computer program comprising instructions which, when executed on at least one processor of a user equipment (UE), cause the at least one processor to carry out the method according to claim 1.

17. A carrier containing the computer program of claim 16, wherein the carrier is a non-transitory computer readable storage medium.

* * * * *